H. C. McBRAIR.
SHIFTING MECHANISM.
APPLICATION FILED NOV. 21, 1911.
1,197,748.
Patented Sept. 12, 1916.
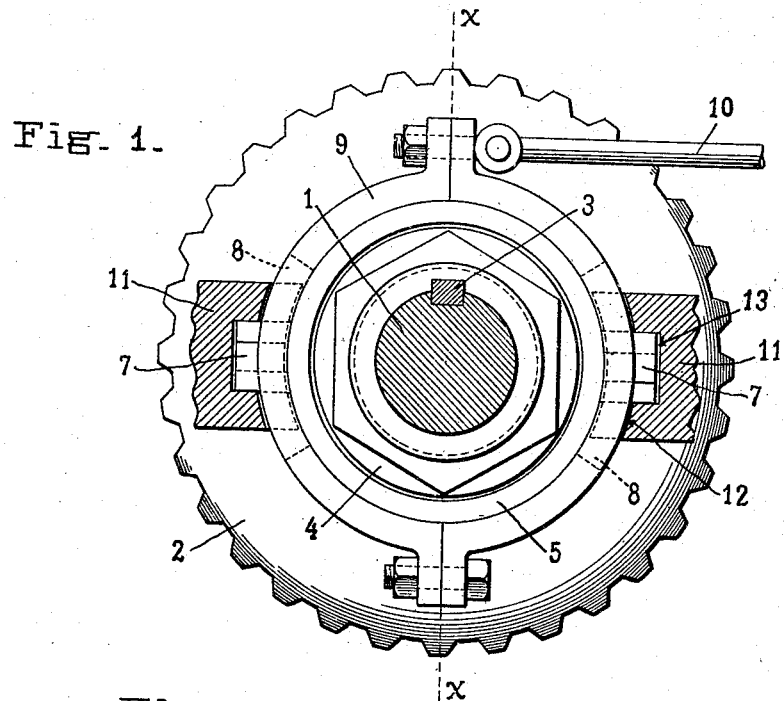
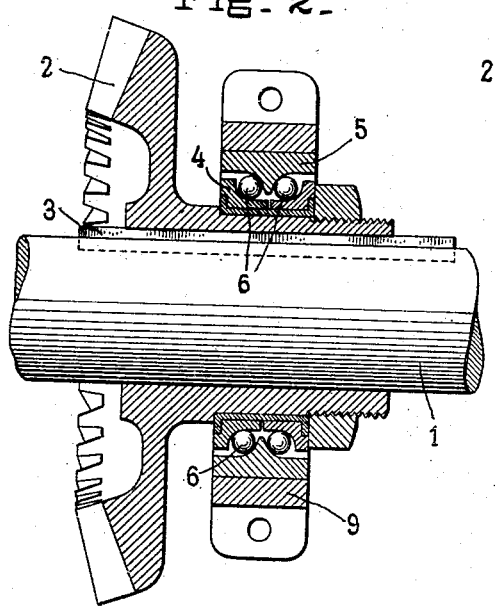
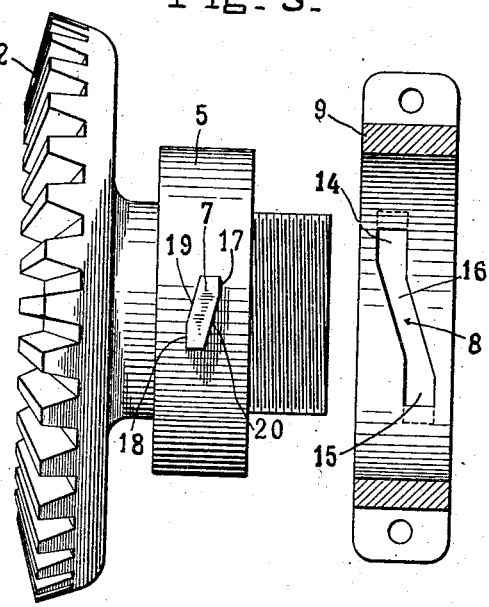
WITNESSES
INVENTOR
Henry C. McBrair,
BY
ATTORNEY

UNITED STATES PATENT OFFICE.

HENRY C. McBRAIR, OF MIDDLETOWN, NEW YORK, ASSIGNOR TO DIRECT DRIVE GEAR COMPANY, OF PATERSON, NEW JERSEY.

SHIFTING MECHANISM.

1,197,748. Specification of Letters Patent. Patented Sept. 12, 1916.

Application filed November 21, 1911. Serial No. 661,612.

*To all whom it may concern:*

Be it known that I, HENRY C. McBRAIR, a citizen of the United States, and a resident of Middletown, in the county of Orange and State of New York, have invented certain new and useful Improvements in Shifting Mechanism, of which the following is a full, clear, and exact description, whereby any one skilled in the art may make and use the same.

The invention relates to a device for axially shifting a gear clutch member or other device and pertains more particularly to a mechanism free from friction.

The object of the invention is to provide a shifting device which will require little or no power even in moving heavy bodies, and which, when moved, will interlock and be proof against creeping and accidental movements.

Referring to the drawings: Figure 1 is a view in side elevation with parts broken in section to illustrate the construction. Fig. 2 is a sectional view on the line $x$—$x$ of Fig. 1. Fig. 3 is a view of the parts in side elevation partially in section and unassembled.

Referring to the drawing, the numeral 1, denotes a shaft sleeve or other rotating part upon which is mounted a member 2, illustrated herein as a gear and designed to have an axial movement along the rotary member though connected thereto with a key or spline 3. Secured to the member 2, is a double ball race member 4, which has a co-operating race ring 5, with the intermediate anti-friction balls 6. This ball race 4, may be secured to the member to be shifted in any desired manner. The outer ball race member 5, has operatively arranged thereon lugs 7, which project through slots 8, arranged in the rotating ring member 9. This ring member 9, may be connected to any suitable rod or connection as 10, to an operating handle whereby the ring 9, may be rotated.

As illustrated in Fig. 1, it is preferred to have the lugs 7, extend through the rotating ring 9, and into a fixed support 11, which support is grooved as at 12, and overlaps the edges of the rotating ring 9, thus preventing any axial movement of said ring. Slots 13 are, of course, provided in the fixed member 11, to permit axial movement of the lugs 7, and the ring 5, but prevent rotary movement of said ring and lugs. The slots 8, of the rotating ring have straight circumferential portions 14, 15, and an intermediate angularly disposed slot 16. The lug 7, has straight faces 17, 18, and angularly disposed faces 19, 20. The arrangement of the faces of the lug and the slot openings correspond. It follows that when the lugs 7, are at either end of the slot openings 16, they will be practically locked against movement. At the same time, when the ring 9, is rotated, these lugs will be moved laterally or axially of the shaft by the angularly disposed slots 16.

Obviously, the device, as described, provides against in-thrust inasmuch as there is an anti-friction bearing intermediate the member 2, to be moved and the rotating ring 9, and as the slot 16, may be of gradual declination, little or no power is required to locate the ring 9.

It is apparent that the device hereinabove described is quite different from the well-known forms of shifting devices which embody a stationary member having a cam face and a movable shifting member having a cam face opposed thereto with an intermediate rotary cam for forcing or wedging the movable member away from the stationary member. In such devices, springs or similar means are employed for moving the shifting member in both directions.

The device above described differs materially as the shifting mechanism is continuously and permanently mounted upon the member to be shifted and has no cams intermediate the movable member and the stationary member for forcing the two apart. Its positive connections and arrangement make it possible to shift the movable member along its shaft while it is connected therewith through a key or spline with ease and certainty, locking it in either position of its throw. It is proof against creeping or crawling due to the rotating parts.

Obviously, the device might be applied to any member which it is desired to shift axially of its shaft without interfering with the constant rotation of said members and the exact details and formation of the rings, lugs and appurtenant parts might be varied to a great extent without departing from the spirit or intent of the invention.

What I claim as my invention and desire to secure by Letters Patent is:

1. A shifting mechanism embodying an inner double ball race member having two sets of balls, said member secured to and axially movable with a rotary member to be shifted axially, an outer ball race ring having a double race-way and a centrally arranged member projecting between the two sets of balls, said race ring being non-rotative though axially movable and forming a supporting and thrust bearing for the axially movable rotary member, a rotary member surrounding the outer race ring and forming a supporting bearing therefor, said rotary member being positively held against axial movement by a stationary supporting member and means intermediate said ring and outer race ring member for shifting the latter upon rotation of the former.

2. In a shifting mechanism, in combination with a rotary shaft and a member to be moved axially of said shaft, a double ball race member fixed upon said axially movable member and rotating therewith, two sets of balls, one for each race member, a coöperating ball race member having a central dependent web projecting between the two sets of balls and providing a raceway on both sides of said web, said ball-race members fixed against rotary movement, a rotary ring supported in a fixed frame against axial movement and rotating in slots formed in said frame, and having slots formed therethrough which have their main portion angularly disposed to the axis of the ring and with the ends of the slots extending circumferentially of the ring, lugs upon the ball-race member projecting through said slots, said lugs having faces corresponding to the angular slots and having their opposite ends corresponding to the circumferentially formed ends of the slots, said lugs projecting beyond the ring and longitudinal grooves in the fixed supporting members engaging said lugs.

3. A shifting mechanism embodying a ball race member, a ball race member co-operating therewith, said race member being non-rotative though axially movable, a rotary member surrounding the ball races, said member being positively held against axial movement, and means intermediate said ring and ball race members for shifting the latter axially upon rotation of the former, said means embodying parallelly disposed circumferential slots joined by an angularly formed slot and lugs having locking faces corresponding to the circumferential portion of the slot and angularly disposed faces corresponding to the intermediate section of the slots.

4. In a device of the class specified in combination with a rotary shaft and a member to be axially moved thereon, a double ball race member secured to said member, a coöperating double ball race member, a set of balls in each race member, a fixed support having slots for holding the second ball race member against rotation though permitting axial movement thereof, a rotary ring engaging slots in the fixed support, said ring surrounding the last-named ball race member and having an angularly disposed slot formed therein and having its ends extending circumferentially of the ring and in continuation of the angular portion of the slot and lugs upon the ball-race member having angularly disposed faces corresponding to the angular portion of the slot and with locking faces on opposite sides thereof, one of said faces engaging the angular portion of the slot and the other of the faces engaging the circumferential portion of the slot when the ring is shifted to extreme positions.

HENRY C. McBRAIR.

Witnesses:
KATE BRENNER,
FRANCIS COLETY.

Copies of this patent may be obtained for five cents each, by addressing the "Commissioner of Patents, Washington, D. C."